United States Patent
Lv et al.

(10) Patent No.: US 12,430,891 B2
(45) Date of Patent: Sep. 30, 2025

(54) DETECTION METHOD, DEVICE, APPARATUS, AND STORAGE MEDIUM

(71) Applicant: Lenovo (Beijing) Limited, Beijing (CN)

(72) Inventors: Guangyi Lv, Beijing (CN); Xiaoxuan Tang, Beijing (CN); Haoyu Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 440 days.

(21) Appl. No.: 17/940,301

(22) Filed: Sep. 8, 2022

(65) Prior Publication Data

US 2023/0215143 A1 Jul. 6, 2023

(30) Foreign Application Priority Data

Dec. 31, 2021 (CN) .......................... 202111671950.3

(51) Int. Cl.
*G06V 10/774* (2022.01)
*G06V 20/70* (2022.01)

(52) U.S. Cl.
CPC ............ *G06V 10/774* (2022.01); *G06V 20/70* (2022.01); *G06V 2201/07* (2022.01)

(58) Field of Classification Search
CPC .. G06V 10/774; G06V 20/70; G06V 2201/07; G06N 3/045; G06N 3/084; G06N 3/08; G06F 18/22; G06F 18/214
See application file for complete search history.

(56) References Cited

U.S. PATENT DOCUMENTS

2019/0287297 A1* 9/2019 Abhiram ................ G06N 20/00

OTHER PUBLICATIONS

Cross scene crowd counting, Zhang et al 2015 (Year: 2015).*

* cited by examiner

*Primary Examiner* — Jianxun Yang
(74) *Attorney, Agent, or Firm* — ANOVA LAW GROUP, PLLC

(57) ABSTRACT

A detection method includes obtaining a to-be-migrated model. The to-be-migrated model includes a memory feature set, and the memory feature set represents a feature vector set associated with an application scene corresponding to the to-be-migrated model. The method further includes performing a metric calculation on at least one piece of sample data of a target scene and the memory feature set to obtain at least one metric calculation result, and updating the memory feature set according to the at least one metric calculation result to obtain a target memory feature set. The target memory feature set represents a feature vector set associated with the target scene. The method further includes obtaining a target detection model by replacing the memory feature set of the to-be-migrated model with the target memory feature set.

18 Claims, 4 Drawing Sheets

DETECTION METHOD, DEVICE, APPARATUS, AND STORAGE MEDIUM

CROSS-REFERENCE TO RELATED APPLICATION

This application claims priority to Chinese Patent Application No. 202111671950.3, filed on Dec. 31, 2021, the entire content of which is incorporated herein by reference.

TECHNICAL FIELD

The present disclosure relates to the computer software technology field and, more particularly, to a detection method, a detection device, a detection apparatus, and a storage medium.

BACKGROUND

In manufacturing processes, scene migration requirements of a training model often exist. When scene migration occurs, often, it is difficult to genennerate enough sample data for model training in a short period of time in a new scene, and even if sample data exists, a large amount of data labeling and labeling verification need to be performed on supervised training of the model, which is time consuming and labor intensive.

SUMMARY

Embodiments of the present disclosure provide a detection method. The method includes obtaining a to-be-migrated model. The to-be-migrated model includes a memory feature set, and the memory feature set represents a feature vector set associated with an application scene corresponding to the to-be-migrated model. The method further includes performing a metric calculation on at least one piece of sample data of a target scene and the memory feature set to obtain at least one metric calculation result and updating the memory feature set according to the at least one metric calculation result to obtain a target memory feature set. The target memory feature set represents a feature vector set associated with the target scene. The method further includes obtaining a target detection model by replacing the memory feature set of the to-be-migrated model with the target memory feature set.

Embodiments of the present disclosure provide an electronic device, including a memory and a processor. The memory stores a computer program. The processor is coupled with the memory and, when the computer program is executed, configured to obtain a to-be-migrated model. The to-be-migrated model includes a memory feature set, and the memory feature set represents a feature vector set associated with an application scene corresponding to the to-be-migrated model. The processor is further configured to perform a metric calculation on at least one piece of sample data of a target scene and the memory feature set to obtain at least one metric calculation result and update the memory feature set according to the at least one metric calculation result to obtain a target memory feature set. The target memory feature set represents a feature vector set associated with the target scene. The processor is further configured to obtain a target detection model by replacing the memory feature set of the to-be-migrated model with the target memory feature set.

Embodiments of the present disclosure provide a non-transitory computer storage medium storing a computer program and, when executed by a processor, causes the processor to obtain a to-be-migrated model. The to-be-migrated model includes a memory feature set, and the memory feature set represents a feature vector set associated with an application scene corresponding to the to-be-migrated model. The processor is further configured to perform a metric calculation on at least one piece of sample data of a target scene and the memory feature set to obtain at least one metric calculation result and update the memory feature set according to the at least one metric calculation result to obtain a target memory feature set. The target memory feature set represents a feature vector set associated with the target scene. The processor is further configured to obtain a target detection model by replacing the memory feature set of the to-be-migrated model with the target memory feature set.

DETAILED DESCRIPTION OF THE EMBODIMENTS

Figure 1:
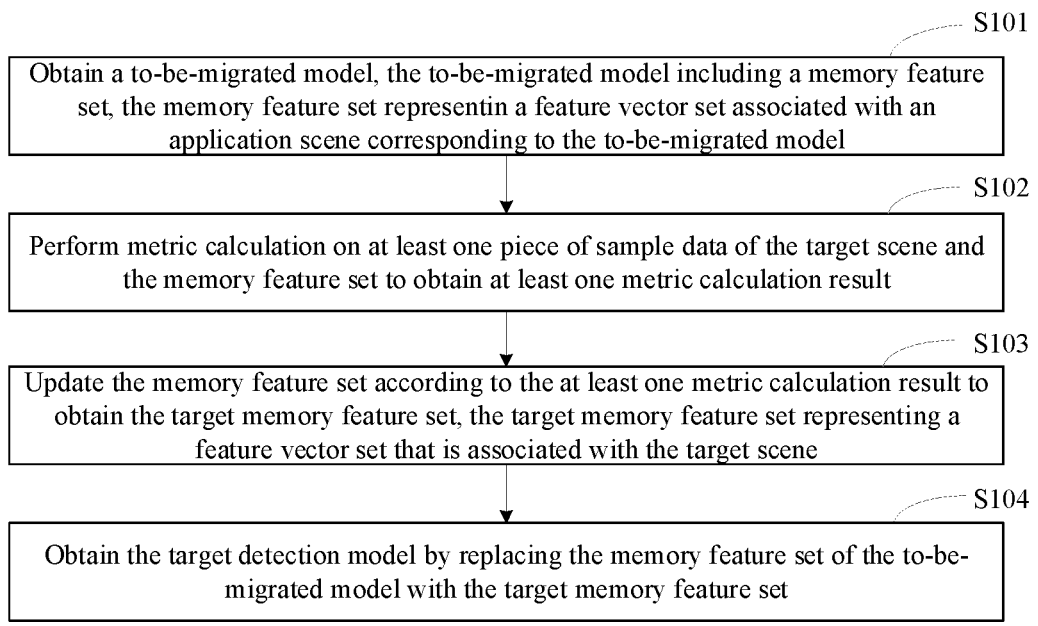
FIG. 1 illustrates a schematic flowchart of a detection method according to embodiments of the present disclosure.

The technical solutions of embodiments of the present disclosure will be described in detail below in connection with the accompanying drawings of embodiments of the present disclosure. The specific embodiments described herein are only used to explain the related disclosure, but not to limit the disclosure. In addition, to facilitate the description, only parts related to the relevant disclosure are shown in the accompanying drawings.

Unless otherwise defined, all technical and scientific terms used here have the same meaning as commonly understood by one of ordinary skill in the art. The terms used here are only for the purpose of describing embodiments of the present disclosure and are not intended to limit the present disclosure.

In the following description, the phrase "some embodiments" includes a subset of all possible embodiments. "some embodiments" may include a same or a different subset of all possible embodiments, which can be combined with each other without conflict.

The term "first\second\third" in embodiments of the present disclosure is only used to distinguish similar objects and does not represent a specific order of objects. With "first\second\third" in a permitted situation, a specific order or sequence may be interchanged to enable embodiments of the disclosure described here to be implemented in a sequence different from the sequence illustrated or described here.

In manufacturing processes, scene migration requirements of a model often exist (for example, the model may be moved from an old production line to a new production line due to production expansion). When scene migration occurs, often, it is difficult to genennerate enough sample data for model training in a short period of time in a new scene, and even if sample data exists, a large amount of data labeling and labeling verification need to be performed on supervised training of the model, which is time consuming and labor intensive. In many cases, in order to improve the inference efficiency of the model, especially for a model deployed in a light edge device, the model may be pruned and quantized before deployment. Thus, the model cannot be updated on the edge device.

Accordingly, embodiments of the present disclosure provide a detection method. The method may include obtaining a to-be-migrated model. The to-be-migrated model may include a memory feature set. The memory feature set may represent a feature vector set that is associated with an application scene corresponding to the to-be-migrated model. The method may further include performing a metric calculation on at least a piece of sample data of a target scene and the memory feature set to obtain at least one metric calculation result and updating the memory feature set according to the at least one metric calculation result to obtain a target memory feature set. The target memory feature set may represent a feature vector set associated with the target scene. The method may further include replacing the memory feature set in the to-be-migrated model with the target memory feature set to obtain a target detection model. Thus, when the to-be-migrated model is migrated to the target scene, based on the metric calculation between the features, the memory feature set of the to-be-migrated model may be updated and replaced by using the sample data of the target scene. Thus, the updated target memory feature set may be suitable for the target scene, such that the to-be-migrated model may be updated and migrated with relatively few sample data. An updating speed may be fast, and time and labor cost may be saved. In addition, the method may be further suitable for the migration and update of the model that is pruned and quantized and have a wide application range.

Embodiments of the present disclosure may be described in detail below in connection with the accompanying drawings.

In embodiments of the present disclosure, FIG. 1 illustrates a schematic flowchart of a detection method according to embodiments of the present disclosure. As shown in FIG. 1, the method includes the following processes.

At S101, a to-be-migrated model is obtained. The to-be-migrated model includes a memory feature set. The memory feature set represents a feature vector set associated with an application scene corresponding to the to-be-migrated model.

The detection method of embodiments of the present disclosure may be applied to a detection device or an electronic device integrated with an update device. The electronic device may include, for example, a computer, a smartphone, a tablet, a laptop, a palmtop computer, a personal digital assistant (PDA), a navigation device, a server, etc., which is not limited by embodiments of the present disclosure.

The detection method of embodiments of the present disclosure may be suitable for the process of updating a small sample of a model on an edge device with weak computation power with relatively few training samples. Therefore, the electronic device may also include an edge device such as an edge computation box. A central processing unit (CPU) of the edge device may include an advanced RISC machine (ARM) structure. If the edge device includes a graphics processing unit (GPU), the edge device may include a lightweight edge device such as Jetson NX.

Embodiments of the present disclosure may be applied to a model migration process. Migration may represent that the model may be updated from one application scene to another application scene. The model may refer to a model for a target detection problem and may be configured to detect the target. The method of embodiments of the present disclosure may be referred to as the detection method. In the subsequent description, implementation of embodiments of the present disclosure may be described exemplarily by taking the model as the target detection model and the detected object as a to-be-detected image for example.

The to-be-migrated model may represent the model before scene migration is performed. Thus, the to-be-migrated model may include the memory feature set. The memory feature set in the to-be-migrated model may represent the feature vector set that is associated with the application scene corresponding to the to-be-migrated model.

For example, if the application scene of the to-be-migrated model is scene A, the memory feature set may represent a feature vector set that is associated with scene A. In some embodiments, in scene A, a detection target of the to-be-migrated model may be target A. Then, the memory feature set may represent the feature vector set of target A. The feature vector here may mainly refer to a prototype vector of target A. That is, a memory feature may be a prototype vector set of a target object.

In some embodiments, the to-be-migrated model may include a memory module. The memory module may store a memory feature set. The method may further include obtaining an initial training set, an initial training set including training samples corresponding to a plurality of tasks, performing model training according to the initial training set to establish an initial model that includes the memory module, obtaining real image data, and performing a model adjustment on the initial model by using the real image data to obtain the to-be-migrated model.

For the to-be-migrated model, the model architecture may include a memory module. The memory module may be configured to store the memory feature set. In embodiments of the present disclosure, when the method is applied to the edge device, since the computation power of the edge device is weak, performing training on a large number of training samples may cause excessive memory usage. Therefore, when the initial model is trained, multi-task model training may be performed on the cloud device to create the initial model including the memory module.

In embodiments of the present disclosure, the migration update of the to-be-migrated model may be realized based on the replacement of the memory feature set. Thus, the initial model obtained by performing pre-training with multiple tasks may need to be configured to realize the scene adaptation during the model migration process.

When the initial model is obtained by performing the model training using the initial training set, the initial training set may include training samples corresponding to several tasks. The several tasks may include a plurality of tasks that are similar to the target tasks of the to-be-migrated model. The initial training set may usually include many training samples. Thus, the detection result of the initial model may be more accurate. The multi-task model training process may be a meta-learning process. The initial model including a memory module may be established by training the multi-task model.

In the process of performing training on the multi-task model, the detection result of the model may be determined by using a full metric decoding mechanism. That is, for the initial model, the to-be-migrated model and the target detection model that are obtained by updating the initial model, the detection result of the model may be only related to the metric calculation result and may not depend on the input training sample or the to-be-detected image.

In some embodiments, the initial model may include an encoder, a memory module, and a decoder. The encoder may be configured to perform feature extraction on a training sample (such as a sample image) to obtain depth feature information of the training sample. The memory module may store a memory feature set corresponding to each task. The metric calculation may be performed on each piece of depth feature information of the training sample and each feature vector in the memory feature set of the corresponding task. Thus, a metric calculation result of each piece of depth feature information of the training sample and the corresponding feature vector in the memory feature set may be obtained. The obtained metric calculation result may be input to the decoder. The detection result may be obtained by performing decoding by the decoder. The detection result may be compared to a real result that is marked in advance. Iterative operations may be performed based on a loss function until the initial model is obtained. That is, when the initial model is trained at the cloud end, the training may be mainly performed on the decoder of the model to obtain an accurate detection result.

For the metric calculation of the depth feature information and the feature vector in the memory feature set, for example, the memory feature set may include feature vector 1, feature vector 2, and feature vector 3, then when the feature extraction is performed on the training samples, the obtained depth feature information may include depth feature 1', depth feature 2', and depth feature 3'. Depth feature 1' is the depth feature information of corresponding feature vector 1 in the training sample, depth feature 2' is the depth feature information of corresponding feature vector 2 in the training sample, and depth feature 3' is the depth feature information of corresponding feature vector 3 in the training sample. When the metric calculation is performed, the metric calculation results of feature vector 1 and depth feature 1', feature vector 2 and depth feature 2', and feature vector 3 and depth feature 3', respectively, to obtain three metric calculation results. The three metric calculation results may be input to the decoder to perform decoding.

After the initial model is obtained, since the memory feature set stored in the memory module corresponds to the memory feature set of several tasks, these tasks may not adapt to the target task when the model is actually used. Therefore, the memory feature set of the initial model may be cleared. Then, a corresponding memory feature set may be generated based on the real application scene of the model.

The initial model may be deployed on the edge device, and the initial model may be fine-tuned based on real image data to obtain the to-be-migrated model. The real image data may include sample image data of the real application scene corresponding to the model when the model is deployed on the edge device. Performing fine-tuning on the model may include generating the memory feature set of the current real application scene and storing the memory feature set into the memory module of the model.

In some embodiments, generating the memory feature set may include extracting the feature vector of the target object that needs to be detected from each piece of real image data and averaging all real image data for each feature vector to obtain an average of each feature vector. The average of the feature vector may be also referred to as a prototype vector. Averages of feature vectors may form the memory feature set of the real application scene. The feature vector set of the several tasks may be also determined in this manner.

In summary, for n pieces of real image data, if the feature vector of the target object includes at least vector A, then for vector A, the feature vector corresponding to vector A may be extracted from each piece of real image data, that is, n feature vectors corresponding to vector A. An average of the n feature vectors may be calculated to obtain vector A in the memory feature set.

At S102, the metric calculation is performed on at least one piece of sample data of the target scene and the memory feature set to obtain at least one metric calculation result.

At S103, the memory feature set is updated according to the at least one metric calculation result to obtain the target memory feature set. The target memory feature set represents a feature vector set that is associated with the target scene.

The at least one piece of sample data of the target scene may be a sample data set used to update the to-be-migrated model. The metric calculation may be performed on the at least one piece of sample data of the target scene and the memory feature set to obtain the metric calculation result of the at least one piece of sample data and the memory feature set. The memory feature set may be updated according to the obtained metric calculation result to obtain the target memory feature set. Then, the target memory feature set may be the feature vector set that is associated with the target scene.

For example, the target scene may be scene B. Thus, the memory feature set may represent the feature vector set that is associated with scene B. In some embodiments, in scene B, the detection target of the to-be-migrated model may be target B. Thus, the memory feature set may represent the feature vector set of target B. The feature vector here may mainly refer to the prototype vector of target B.

For the sample data, in some embodiments, before performing the metric calculation on the at least one piece of sample data of the target scene and the memory feature set, the method may further include determining the target scene, obtaining at least one piece of initial sample data of the target scene according to the target scene, and performing labeling processing on the at least one piece of initial sample data to obtain the at least one piece of sample data of the target scene.

When the sample data of the target scene is determined, the at least one piece of initial sample data of the target scene may be obtained based on the target scene. Then, the initial sample data can be labeled. For example, the initial sample data is an image. Labeling may be performed on a type or frame of the target object in the image to obtain the sample data. Therefore, when the metric calculation is performed, depth feature information may be accurately extracted from the sample data. In addition, if back-propagation training is performed on the to-be-migrated model, supervised training and updating may also be performed on the to-be-migrated model according to the labeled sample data.

The metric calculation may include but is not limited to Euclidean distance calculation, Mahalanobis distance calculation, Manhattan distance calculation, Minkowski distance calculation, Hamming distance calculation, Jaccard correlation coefficient calculation, Cosine similarity calculation, Chebyshev distance calculation, or Pearson Correlation calculation. Since the metric calculation may usually be a distance calculation between two individuals, the metric calculation result may also be referred as a distance value.

A similarity degree between the individuals may be determined by the metric calculation. In some embodiments, the smaller the value of the metric calculation result is, the higher the similarity degree between the individuals is. The larger the value of the metric calculation result is, the greater the difference between the individuals is.

Performing the metric calculation on the at least one piece of sample data of the target scene and the memory feature set may include for each piece of sample data (taking an image as an example), first performing the feature extraction on each piece of sample data to obtain at least one piece of depth feature information of each piece of sample data, for any piece of depth feature information, obtaining the average depth feature information by performing an average calculation on the depth feature information of all the sample data, and performing the metric calculation on the feature vector corresponding to the average depth feature information in the memory feature set and the average depth feature information to obtain the metric calculation result. For the feature vector with the metric calculation result greater than a metric threshold, the feature vector may be updated by using the depth feature information. For example, the feature vector may be replaced using the average depth feature information. For the metric calculation result not greater than the feature vector of the metric threshold, the feature vector may not need to be updated. Thus, the metric threshold may be a threshold value used to represent a magnitude of the difference between the two individuals.

Performing the metric calculation on the at least one piece of sample data of the target scene and the memory feature set may also include first performing the feature extraction on the at least one piece of sample data to obtain several pieces of depth feature information and performing the metric calculation on the depth feature information with each feature vector of the memory feature set to obtain metric calculation results of the depth feature information with each feature vector of the memory feature set, and using a smallest metric result as the metric calculation result of the depth feature information with the memory feature set.

Thus, for each piece of depth feature information, the metric calculation result of the depth feature information with the memory feature set may be obtained. Then, the average may be calculated for the metric calculation results. The average may represent a difference degree between the sample data set having at least one piece of sample data and the memory feature set. When the average is big, the difference degree between the sample set and the memory feature set may be big. That is, the target scene may have a large difference with the scene of the to-be-migrated model. When the average is small, the difference degree between the sample set and the memory feature set may be small. That is, the target scene may have a small difference with the scene of the to-be-migrated model.

Thus, a metric threshold may still be set. The metric threshold may be a threshold used to represent the difference degree between the two scenes. If the average is greater than the metric threshold, the difference between the target scene and the scene of the to-be-migrated model may be big. Thus, a new target memory feature set may be generated based on the sample data. If the average is not greater than the metric threshold, the difference between the target scene and the scene of the to-be-migrated model may be small. Thus, the memory feature set may need to be partially updated. For example, features with the metric calculation results greater than the metric threshold may be updated.

That is, the metric calculation may be performed on the at least one piece of sample data of the target scene with the memory feature set to obtain the at least one metric calculation result. The similarity degree between the target scene and the application scene of the to-be-migrated model may be determined by the at least one metric calculation result. If the similarity degree is high, a part of the feature vectors in the memory feature set may need to be updated, and the other part of the feature vectors may remain the same as the feature vectors in the original memory feature set. If the similarity degree is low, the new target memory feature set may be generated to perform incremental learning.

A determination manner of the metric calculation result may include the above two manners. In addition, for those skilled in the art, the similarity degree between the application scene of the to-be-migrated model and the target scene may be determined in anther manner to determine the target memory feature set, which is not described in detail here.

In some embodiments, a simple example is used to illustrate the target scene and the application scene of the to-be-migrated model and the update of the memory feature set. If the to-be-migrated model is a target detection model for a red apple. That is, the application scene of the to-be-migrated model may include a scene of performing detection on fruit of a to-be-detected image to determine whether the fruit in the to-be-detected image is a red apple and/or determine that the red apple is in an edge frame of the to-be-detected image. Then, the memory feature set may represent a feature vector set of the red apple. That is, a prototype vector of the red apple. If the target scene includes a scene of determining whether the fruit in the to-be-detected image is a green apple and/or determining that the green apple is in the edge frame of the green apple in the to-be-detected image. Thus, the red apple and the green apple may be determined to have a high similarity after the metric calculation. Therefore, a part of the feature vectors in the memory feature set may need to be updated, and the other part of the feature vectors may remain unchanged to obtain the target memory feature set. If the target scene includes a scene of determining whether the fruit in the to-be-detected image is a banana and/or determining that the banana is in the edge frame of the to-be-detected image. Thus, after the metric calculation, the red apple and the banana may be determined to have low similarity. Therefore, a new target memory feature set may be generated based on sample data of the banana.

In addition, for some scenes that are simple, and the similarity degree is easy to be determined by people, an update degree of the memory feature set may be determined by a development engineer without based on the metric calculation result to determine the target feature set.

At S104, the target detection model is obtained by replacing the memory feature set of the to-be-migrated model with the target memory feature set.

After the target memory feature set is obtained, the memory feature set in the to-be-migrated model may be replaced with the target memory feature set. The model obtained after the replacement may be the target detection model. Thus, the migration and update of the to-be-migrated model may be completed. In addition, after the target detection model is obtained, if model migration is required later, the target detection model may be used as the to-be-migrated model, and the migration update of the to-be-migrated model may be implemented as described above.

In some embodiments, if the to-be-migrated model is a model without pruning and quantization processing, the method may further include performing data expansion on the at least one piece of sample data of the target scene to obtain an expanded data set and performing backpropagation training on the to-be-migrated model using the expansion data set to update model parameters of the to-be-migrated model except the memory feature set.

If the to-be-migrated model is a model after the pruning and quantization processing, unimportant channels in the model may be deleted, and a weight and an offset represented by a floating-point number in the model may be approximated using low-precision integers. Thus, the model may occupy less memory, and the calculation speed may be faster. However, the model at this time may be no longer suitable for calculating a parameter gradient. Thus, the to-be-migrated model with the pruning and quantization processing may be updated in the manner of replacing the memory feature set of embodiments of the present disclosure.

For the to-be-migrated model without the pruning and quantization processing, in addition to updating the memory feature set, the to-be-migrated model may be iteratively updated in a backpropagation training manner to update other parameters of the to-be-migrated model, such as a network weight.

When an amount of the at least one piece of sample data of the target scene is small, the backpropagation training may cause overfitting of the model. Therefore, data expansion may be performed on the sample data of the target scene to obtain a large amount of sample data to form the expanded data set. The back-propagation training may be performed on the to-be-migrated model using the expansion data set to perform iterative updating to update the other model parameters of the to-be-migrated model.

A data expansion manner may include, for example, performing mirror processing, rotation processing (e.g., rotating the sample image by a certain angle), scale transformation processing (e.g., changing the resolution of the image), and extraction processing (e.g., extracting a part of the sample image as a new sample image), and color dithering (e.g., adding a slight noise) processing on the sample data (such as a sample image).

Thus, the memory module may be updated in the obtained target detection model, and the other parameters may be also updated. That is, if the backpropagation training is not involved, when the to-be-migrated model is updated in embodiments of the present disclosure, the memory module may be mainly updated. Thus, the update speed may be faster, the update may be completed without a large amount of sample data.

Further, when the detection is performed on the to-be-detected image using the target detection model, in some embodiments, the method may further include obtaining the to-be-detected image, performing the metric calculation on the to-be-detected image and the target memory feature set using the target detection model to obtain the target metric calculation result, and determining the target detection result according to the target metric calculation result. The target memory feature set may include at least one piece of memory feature information.

For example, a to-be-detected object may be the to-be-detected image, when the detection is performed on the to-be-detected image when the to-be-detected image is detected after the to-be-detected image is obtained, the to-be-detected image may be input into the target detection model to perform the metric calculation on the to-be-detected image and the target memory feature set to obtain the target metric calculation result. The target detection result may be determined according to the target metric calculation result.

Further, in some embodiments, performing the metric calculation on the to-be-detected image and the target memory feature set by the target detection model to obtain the target metric calculation result may include performing the feature extraction on the to-be-detected image to obtain the at least one piece of depth feature information and performing the metric calculation on the at least one piece of depth feature information and the at least one piece of memory feature information.

The target feature set may include at least one piece of memory feature information. The memory feature information may be the feature vector that is associated with the target scene, that is the prototype vector of the target object that needs to be detected in the target scene.

Performing the metric calculation on the to-be-detected image and the target memory feature may mainly refer to performing the metric calculation on the depth feature information and the memory feature information of the to-be-detected image. Thus, the feature extraction may be performed first on the to-be-detected image. An encoder in the target detection model may be configured to perform the feature extraction on the to-be-detected object to obtain the at least one piece of depth feature information. The at least one piece of depth feature information may be mainly the part of feature information corresponding to the at least one piece of feature information in the to-be-detected image.

The metric calculation may be performed in a one-to-one correspondence between the at least one piece of depth feature information and the at least one piece of memory feature information to obtain at least one metric calculation result, that is the target metric calculation result.

After the target metric calculation result is obtained, the target detection result may be determined according to the target metric calculation result.

In some embodiments, determining the target detection result according to the target metric calculation result may include performing decoding processing on the target metric calculation result to obtain the target detection result of the to-be-detected image.

When the target detection result is determined, the decoding processing may be performed on the target metric calculation result. A decoder of the target detection result may be configured to perform the decoding processing on the target metric calculation result to obtain the target detection result. For example, the target metric calculation result may be decoded to obtain the type of the target object or label an area of the edge frame where the target object of the to-be-detected image is located.

Embodiments of the present disclosure provide a detection method. The method may include obtaining the to-be-migrated model. The to-be-migrated model may include the memory feature set. The memory feature set may represent the feature vector set that is associated with the application scene corresponding to the to-be-migrated model. The method may further include performing the metric calculation on the at least one piece of sample data of the target scene with the memory feature set to obtain the at least one metric calculation result and updating the memory feature set according to the at least one metric calculation result to obtain the target memory feature set. The target memory feature set may represent the feature vector set that is associated with the target scene. The method may further include replacing the memory feature set in the to-bemigrated model with the target memory feature set to obtain the target detection model. Thus, since performing the target detection using the model includes performing decoding on the metric calculation result between the to-be-detected image and the memory feature set to determine the detection result, the detection result may be only related to the metric calculation result and may not depend on the depth feature information of the to-be-detected image. Thus, when the migration update is performed on the model, a small amount of sample data of the target scene may be used to obtain the target memory feature set to replace the memory feature set of the memory module. The decoder of the model may not need to be trained again. Thus, on an aspect, for a new scene with a small amount of training samples, a small sample migration update may be realized for the model. On another aspect, since the update of the memory feature set is a replacement process of the prototype vector, the migration update of the model may be realized by replacing the memory feature set of the memory module. Thus, during the migration update process of the model, a large amount of iterative calculation may not be needed. The adaptation and update may be completed in a short time (e.g., several minutes), which saves time and labor cost. On another aspect, since the model detection process based on the metric calculation results is a forward inference process and does not rely on back propagation, a loss function may not need to be created, and a gradient may not need to be calculated when the migration update of the model is performed. The migration update may also be performed on the model after the quantization.

Figure 2:
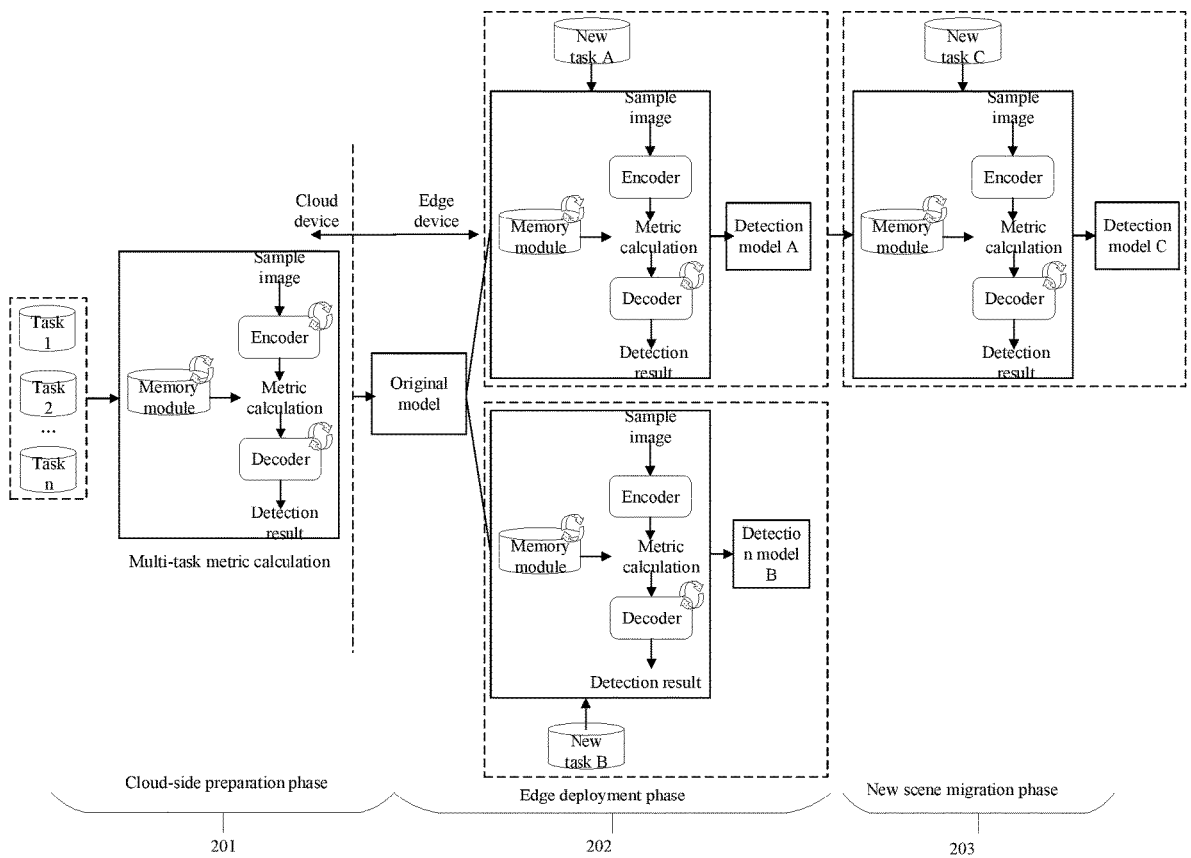
FIG. 2 illustrates a schematic flow structure of the detection method according to embodiments of the present disclosure.

In some other embodiments of the present disclosure, FIG. 2 illustrates a schematic flow structure of the detection method according to embodiments of the present disclosure. As shown in FIG. 2, the flow structure mainly includes a cloud-side preparation phase 201, an edge deployment phase 202, and a new scene migration phase 203.

In the cloud-side preparation phase 201, meta-learning is performed mainly based on training samples of a relevant task group to construct an initial model based on the "memory module." In the edge deployment phase 202, fine-tuning may be performed on the initial model mainly based on business data of the application scene of the edge device to obtain the corresponding detection model. In the new scene migration phase 203, the migration and update of the model may be performed based on business data of a new scene when the edge device switches scenes to obtain the detection model corresponding to the new scene.

As shown in FIG. 2, in embodiments of the present disclosure, a small sample update of the model may be implemented based on multi-task metric learning. The detection model may include an encoder, a decoder, and a memory module. When the target detection is performed, the forward inference of the model may be used. That is, an inference principle and an inference process of the detection model may include the following processes.
  (1) The to-be-detected image is input into the encoder, and the depth feature information of the to-be-detected image is obtained through the encoder.
  (2) The metric calculation is performed on the depth feature information of the to-be-detected image and the memory feature information of the memory module to obtain the metric calculation result.
  (3) The metric calculation result is input into the decoder for decoding to obtain the detection result.

For such a detection model based on "encoder-decoder-memory module," multi-task pre-training may be used to create the initial model. Thus, the detection model may be updated by updating the memory feature set of the memory module to realize the adaption of the scene.

Relevant processes in the cloud-side preparation phase 201 may be usually performed on a cloud device. In the cloud-side preparation phase 201, the encoder and the decoder of the model may be trained to cause the model to perform the feature extraction on the input image and perform decoding according to the metric calculation result to obtain the detection result.

In some embodiments, on the cloud device, the meta-learning may be performed based on training samples of the related task group to create the initial model based on the "memory module." The relevant task group may include a plurality of tasks that are similar to the target task and have a large amount of training samples. The relevant task group may be determined by the model development staff, for example, task 1, task 2, . . . , task n shown in FIG. 2. The target task may represent a specific task corresponding to a practical application process of the model.

For example, the target task may be a target detection type task. For example, the target task may be a detection task for animal A. Thus, whether the animal in the image is animal A may need to be determined, and/or an area where animal A is located in the image may be frame-selected. The relevant task group may include detection tasks of animal B, animal C, animal D, and animal E. the memory module may store memory feature sets of animal B, animal C, animal D, and animal E. The meta-learning may be performed by using animal B, animal C, animal D, and animal E as the training samples to obtain the initial model.

In embodiments of the present disclosure, the meta-learning process may be referred to as a multi-task full-metric learning process. Multi-task may represent that the training samples used to train the initial model are from the relevant task groups similar to the target task. The amount of the training samples in the relevant task group may be relatively large. The full-metric learning may represent that the obtained detection result may be related to the metric calculation result between the depth feature information of the input image and the memory feature information for the decoder of the model and may no longer depend on the original depth feature information of the input image.

In the multi-task full-metric learning process, first, the sample image of the relevant task group may be input into the decoder. Decoding may be performed by the decoder to obtain the depth feature information of the sample image. In some embodiments, the depth feature information of the sample image may include some features corresponding to the memory feature information in the memory module. Then, for each piece of decoded depth feature information, the metric calculation may be performed on each piece of decoded depth feature information with the corresponding memory feature information in the memory module to obtain the metric calculation result corresponding to each depth feature information. Then, the metric calculation result may be input into the decoder for decoding to obtain the detection result. The detection result may be compared with the real detection result of the sample image. The detection precision currently achieved by the model may be determined according to the comparison result. The next sample image may continue to be input to iteratively perform the process until the detection precision of the model reached the predetermined precision. When the detection precision of the model is determined, a loss function may be set. When a value of the loss function is smaller than the predetermined value, the detection precision of the model may be determined to reach the predetermined precision to obtain the initial model. In some other embodiments, when a number of iterations of the model reach a predetermined value, the initial model may be determined to be obtained.

The memory feature set stored in the memory module of the initial model may correspond to the application scene of the relevant task group and may not necessarily correspond to the application scene of the model in the edge device. Thus, the memory module may be cleared. That is, the initial model having the memory module may be obtained. However, the memory features in the memory module may need to be determined when the model is deployed at the edge device.

After the initial model is obtained, the fine-tuning may be performed on the initial model at the edge device to obtain the detection model that satisfies the application scene of the edge device. Performing the fine-tuning on the initial model may include determining the memory feature set based on the current application scene of the edge device to update the memory module.

For example, as shown in FIG. 2, models are deployed on a plurality of edge devices. For new task A, based on sample data of new task A, a forward inference may be performed on the initial model to determine the memory feature set corresponding to the application scene of new task A. The corresponding memory feature set may be stored in the memory module. For new task B, similar processes may be performed.

Thus, when the target detection is performed by the model, the depth feature of the to-be-detected image may be obtained by the encoder. The metric calculation may be performed on the depth feature information and the memory feature information of the memory feature set to obtain the metric calculation result. After the metric calculation result is input to the decoder, the decoding may be performed by the decoder to obtain the detection result.

The edge device usually may have small computation power and limited storage space. In some embodiments, in the edge deployment phase 202, pruning and quantization may be performed on the fine-tuned model. By deleting some unnecessary channels or unimportant connections in the model, quantizing the weight of the model, and sharing the weight, the memory usage of the model may be reduced without sacrificing the detection precision of the model. The model corresponding to new task A may be recorded as detection model A, and the model corresponding to new task B may be recorded as detection model B.

Further, after detection model A is successfully deployed on the edge device, the application scene of the model may be switched as needed. For example, a new detection task may be performed by the model, or the model may be migrated to another edge device. Based on the update method, the memory module of detection model A may be updated by using the sample data of new task C to obtain detection model C.

If detection model A is a model that has been pruned and quantized, only the memory module may be updated. If detection model A has not been pruned and quantized, the backpropagation may also be used to update other parameters of the model.

When the backpropagation method is used to update the model, since the amount of sample data for the new task is usually small, the small amount of sample data of the new task may be expanded by using the data expansion method to realize iterative training and update of the model.

Thus, the detection method of embodiments of the present disclosure mainly includes the following processes.

(1) In the cloud-side preparation phase, based on the training sample data of related task group, meta-learning is performed to create the initial model based on the "memory module."

(2) In the edge deployment phase, the fine-tuning is performed on the initial model based on the business data (e.g., after the fine-tuning, pruning and quantization are performed on the model). The "memory module" of the task may be obtained through the forward inference and stored.

(3) In the new scene migration phase, when scene switching is performed, a small amount of new scene data is used to generate a new "memory module" through model forward inference to replace the old "memory module."

In some embodiments, If the model is not pruned and quantized, a small amount of data may be expanded using the data expansion method. Thus, some parameters of the new model may be updated using the backpropagation.

The detection method of embodiments of the present disclosure may be described in detail above. In the solution, the initial model may be created based on the multi-task full-metric learning. When the model is migrated, the memory module of the model may be updated with a small amount of sample data to cause the model to quickly adapt to the new application scene. Compared to the existing technology, the method may have the following advantages. Based on a full-metric decoding mechanism, a final prediction result of the detection model may be only related to the metric calculation result between the depth feature information of the to-be-detected image and the memory feature information. Thus, the memory feature set may be strongly related to the specific scene, and other parts of the model may be weakly related to the scene. Therefore, the model may be updated by replacing the memory feature set of the model with a small amount of labeled samples (e.g., tens to hundreds). When the memory module is updated, the model may be updated based on the replacement of the prototype vectors. Thus, the updating process of the model may not require a large amount of iteration, and adaption and update may be completed in several minutes. Since the model is updated only depending on forwarding inference, the loss function may not need to be created, and the gradient may not be calculated, which is suitable for the quantized model. Thus, the model may not depend on the backpropagation when being updated.

Figure 3:
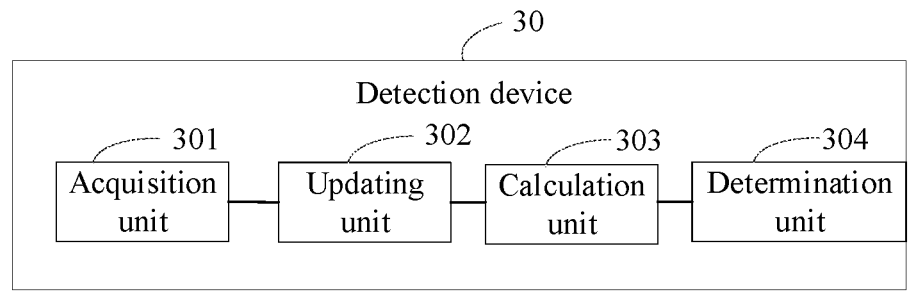
FIG. 3 illustrates a schematic structural diagram of a detection device according to embodiments of the present disclosure.

In some other embodiments of the present disclosure, FIG. 3 illustrates a schematic structural diagram of a detection device 30 according to embodiments of the present disclosure. As shown in FIG. 3, the detection device 30 includes an acquisition unit 301 and an updating unit 302.

The acquisition unit 301 may be configured to obtain the to-be-detected model. The to-be-migrated model may include a memory feature set, and the memory feature may be adapted to the application scene corresponding to the to-be-migrated model.

The updating unit 302 may be configured to perform the metric calculation on at least one piece of sample data of the target scene and the memory feature set to obtain at least one metric calculation result, and update the memory feature set according to the at least one metric calculation result to obtain the target feature set that adapts to the target application scene, and replacing the memory feature set of the to-be-migrated model by using the target memory feature to obtain the target detection model.

In some embodiments, as shown in FIG. 3, the detection device 30 may further include a calculation unit 303 and a determination unit 304.

The acquisition unit 301 may be further configured to obtain the to-be-migrated image.

The calculation unit 303 may be configured to perform the metric calculation on the to-be-detected image and the target memory feature set by using the target detection model to obtain the target metric calculation result.

The determination unit 304 may be configured to determine the target detection result according to the target metric calculation result. The target memory feature set may include at least one piece of memory feature information.

In some embodiments, the calculation unit 303 may be configured to perform feature extraction on the to-be-detected image to obtain at least one piece of depth feature information and perform the metric calculation on at least one piece of depth feature information and at least one piece of memory feature information to obtain the target metric calculation result.

In some embodiments, the determination unit 304 may be configured to perform decoding processing on the target metric calculation result the to obtain the target detection result of the to-be-detected image.

In some embodiments, the acquisition unit 301 may be further configured to determine the target scene, obtain at least one piece of initial sample data of the target scene according to the target scene, and perform labeling processing on the at least one piece of initial sample data to obtain at least one piece of sample data of the target scene.

In some embodiments, the to-be-migrated model may include a memory module. The memory module may store the memory feature set. The acquisition unit 301 may be further configured to obtain an initial training set. The initial training set may include training samples corresponding to a plurality of tasks.

The updating unit 302 may be further configured to perform model training according to the initial training set to create the initial model including the memory module, obtain the real image data, and perform a model adjustment on the initial model using the real image data to obtain the to-be-migrated model.

In some embodiments, obtaining the initial training set, and performing the model training according to the initial training set to create the initial model including the memory module may be performed on the cloud device.

In some embodiments, the updating unit 302 may be further configured to perform the data expansion on the at least one piece of sample data of the target scene to obtain the expanded dataset when the to-be-migrated model is not pruned and quantized, and perform the backpropagation training on the to-be-migrated model using the expanded dataset to update the model parameters of the to-be-migrated model except the memory feature set.

In some embodiments, a "unit" may be a part of a circuit, a part of a processor, a part of a program or software, etc., and may also be a module and may be non-modular. Moreover, components in embodiments of the present disclosure may be integrated into one processing unit, or each unit may exist physically alone, or two or more units may be integrated into one unit. The above-mentioned integrated unit may be implemented in the form of hardware, or can be implemented in the form of software function modules.

If the integrated unit is implemented in the form of the software function module and is not sold or used as an independent product, the integrated unit may be stored in a computer-readable storage medium. Thus, the essence of the technical solution of embodiments of the present disclosure or the part of the technical solution that contributes to the existing technology or all or a part of the technical solution may be implemented in the form of a software product. The computer software product may be stored in a storage medium and include several instructions to cause the computer apparatus (e.g., a personal computer, a server, or a network device) or a processor to perform all or a part of the method of embodiments of the present disclosure. The storage medium may include a U drive, a mobile hard drive, a read-only memory (ROM), a random access memory (RAM), magnetic disk, optical disk, or another medium that can store program codes.

Therefore, embodiments of the present disclosure provide a computer storage medium. The computer storage medium may store a computer program and, when the computer program is executed by a plurality of processors, causes the processors to implement the steps of the method of embodiments of the present disclosure.

Figure 4:
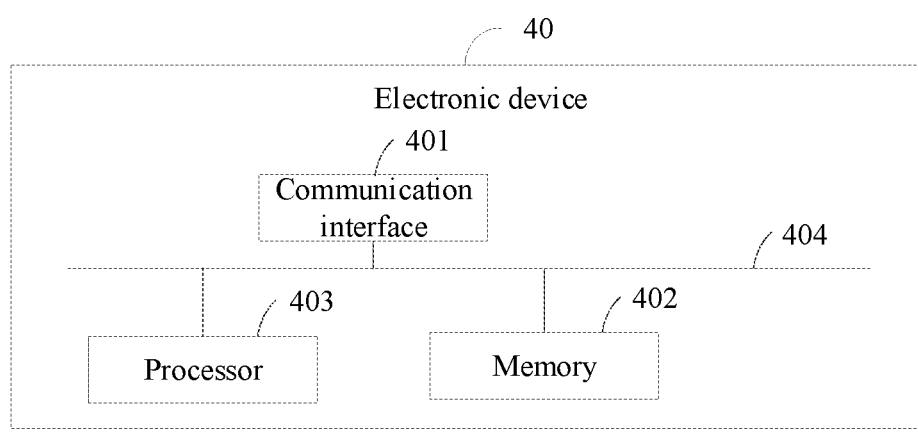
FIG. 4 illustrates a structural diagram showing hardware of an electronic device according to embodiments of the present disclosure.

Based on the composition of the detection apparatus 30 and the computer storage medium described above, FIG. 4 illustrates a structural diagram showing hardware of an electronic device 40 according to embodiments of the present disclosure. As shown in FIG. 4, the electronic device 40 includes a communication interface 401, a memory 402, and a processor 403. The assemblies may be coupled together through a bus device 404. The bus device 404 may be configured to implement the connection and communication between these assemblies. In addition to the data bus, the bus device 404 may also include a power bus, a control bus, and a status signal bus. However, for clarity, the various buses are labeled as bus device 404 in FIG. 4. Among them, the communication interface 401 may be configured to receive and send signals in the process of sending and receiving information with other external network elements.

The memory 402 may be used to store the computer program that can be executed by the processor 403.

The processor 403 may be configured to, when the computer program is executed, obtain the to-be-migrated model, the to-be-migrated model including a memory feature set, and the memory feature set representing a feature vector set associated with the application scene corresponding to the to-be-migrated model, perform the metric calculation on the at least one piece of sample data of the target scene and the memory feature set to obtain the at least one metric calculation result, update the memory feature set according to the at least one metric calculation result to obtain the target memory feature set, the target memory feature set representing the feature vector set associated with the target scene, and obtain the target detection model by replacing the memory feature set in the to-be-migrated model with the target memory feature set.

The memory 402 of embodiments of the present disclosure may be a volatile memory or a non-volatile memory, or may include both volatile and non-volatile memory. The non-volatile memory may be a read-only memory (ROM), a programmable read-only memory (ROM), an erasable programmable read-only memory (EPROM), an electrically erasable programmable read-only memory (EEPROM), or a flash memory. The volatile memory may be a random access memory (RAM), which is used as an external cache. By way of example and not limitation, many forms of RAM may be available, such as a static RAM (SRAM), a dynamic RAM (DRAM), a synchronous DRAM (SDRAM), a double data rate synchronous dynamic random access memory (DDRSDRAM), an enhanced synchronous dynamic random access memory (ESDRAM), a synchronous link dynamic random access memory (SLDRAM), and a direct rambus RAM (DRRAM). The memory 402 of the systems and methods described herein may be intended to include, but not be limited to, these and any other suitable types of memory.

The processor 403 may be an integrated circuit chip with signal processing capability. In an implementation process, the steps of the above-mentioned method may be completed by an integrated logic circuit of hardware in the processor 403 or an instruction in the form of software. The processor 403 may be a general-purpose processor, a digital signal processor (DSP), an application-specific integrated circuit (ASIC), a field programmable gate array (FPGA), or another programmable logic device, a discrete gate or transistor logic device, and a discrete hardware component. The methods, steps, and logic block diagrams disclosed in embodiments of the present disclosure may be implemented or executed. A general-purpose processor may be a microprocessor or the processor may be any conventional processor or the like. The steps of the method disclosed in connection with embodiments of the present disclosure may be directly embodied as executed by a hardware decoding processor, or executed by a combination of hardware and software modules in the decoding processor. The software modules may be located in a random-access memory, a flash memory, a read-only memory, a programmable read-only memory, or an electrically erasable programmable memory, a register, and another storage medium known in the existing technology. The storage medium may be located in the memory 402, and the processor 403 may be configured to read the information in the memory 402 and complete the steps of the above method in connection with the hardware.

Embodiments of the present disclosure may be implemented in hardware, software, firmware, middleware, microcode, or a combination thereof. For hardware implementation, the processing unit may be implemented in one or more of an application-specific integrated circuit (ASIC), a digital signal processing (DSP), a digital signal processing device (DSPD), a programmable logic device (PLD), a field-programmable gate array (FPGA), a general purpose processor, a controller, a microcontroller, a microprocessor, and another electronic unit configured to perform the functions of the present disclosure, or a combination thereof.

For a software implementation, the technology may be implemented through modules (e.g., procedures, functions, etc.) that perform the functions of the present disclosure. Software codes may be stored in memory and executed by the processor. The memory can be implemented in the processor or external to the processor.

In some embodiments, the processor 403 may be further configured to execute the steps of the method of embodiments of the present disclosure when the computer program is executed.

Figure 5:
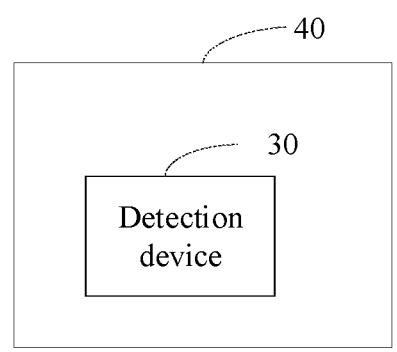
FIG. 5 illustrates a schematic structural diagram of an electronic device according to embodiments of the present disclosure.

In some other embodiments of the present disclosure, based on the above-mentioned schematic diagram of the composition of the model detection device 30, FIG. 5 illustrates a schematic structural diagram of an electronic device 40 according to embodiments of the present disclosure. As shown in FIG. 5, the electronic device 40 includes at least the detection device 30 of embodiments of the present disclosure.

Since the electronic device 40 includes the detection device 30, when the to-be-migrated model is migrated to the target scene, based on the metric calculation between the features, update and replacement may be performed on the memory feature set of the to-be-migrated model using the sample data of the target scene. Thus, the updated target memory feature set may adapt to the target scene. Therefore, the to-be-migrated model may be updated and migrated with a small amount of sample data, which has a faster updating speed and saves time and labor costs. In addition, the method may be suitable for the migration and update of the model that is pruned and quantized. The method may be broadly applied.

The above are only preferred embodiments of the present disclosure and are not intended to limit the protection scope of the present disclosure.

In the present disclosure, the terms "comprising," "including," or any other variation thereof are intended to encompass non-exclusive inclusion, such that a process, method, article, or device comprising a series of elements includes not only those elements, but also other elements not expressly listed or inherent to such a process, method, article or apparatus. Without further limitation, an element defined by the phrase "comprising a . . . " does not preclude the presence of additional identical elements in a process, method, article, or apparatus that includes the element.

The above-mentioned numbers of embodiments of the present disclosure are only for description and do not represent the advantages or disadvantages of embodiments of the present disclosure.

The methods disclosed in method embodiments of the present disclosure can be arbitrarily combined without conflict to obtain new method embodiments.

The features disclosed in product embodiments of the present disclosure may be combined arbitrarily without conflict to obtain new product embodiments.

The features disclosed in method or device embodiments of the present disclosure may be combined arbitrarily without conflict to obtain new method embodiments or device embodiments.

The above are only some embodiments of the present disclosure, but the protection scope of the present disclosure is not limited to this. Those skilled in the art may easily think of modifications or replacements in the technical scope of the present disclosure. These modifications and replacements should be within the scope of the present disclosure. Thus, the scope of the present application should be subject to the scope of the claims.

What is claimed is:
1. A detection method comprising:
obtaining a to-be-migrated model, the to-be-migrated model including a memory feature set, and the memory feature set representing a feature vector set associated with an application scene corresponding to the to-be-migrated model;
performing metric calculation on at least one piece of sample data of a target scene and the memory feature set to obtain at least one metric calculation result;
updating the memory feature set according to the at least one metric calculation result to obtain a target memory feature set, the target memory feature set representing a feature vector set associated with the target scene;
obtaining a target detection model by replacing the memory feature set of the to-be-migrated model with the target memory feature set;
in response to the to-be-migrated model not being pruned and quantized, performing data expansion on at least one piece of sample data of the target scene to expand a data set; and
performing backpropagation training on the to-be-migrated model using the expanded data set to update a model parameter of the to-be-migrated model except for the memory feature set.

2. The method of claim 1, further comprising:
obtaining a to-be-detected image;
performing metric calculation on the to-be-detected image and the target memory feature set using the target detection model to obtain a target metric calculation result; and
determining a target detection result according to the target metric calculation result, the target memory feature set including at least one piece of memory feature information.

3. The method according to claim 2, wherein performing the metric calculation on the to-be-detected image and the target memory feature set using the target detection model to obtain the target metric calculation result includes:
performing feature extraction on the to-be-detected image to obtain at least one piece of depth feature information; and
performing the metric calculation on the at least one piece of depth feature information and the at least one piece of memory feature information to obtain the target metric calculation result.

4. The method according to claim 2, wherein determining the target detection result according to the target metric calculation result includes:
performing decoding processing on the target metric calculation result to obtain the target detection result of the to-be-detected image.

5. The method of claim 1, further comprising, before performing the metric calculation on the at least one piece of sample data of the target scene and the memory feature set:
determining the target scene;
obtaining at least one piece of initial sample data of the target scene according to the target scene; and
performing labeling processing on the at least one piece of initial sample data to obtain the at least one piece of sample data of the target scene.

6. The method according to claim 1,
wherein the to-be-migrated model includes a memory module, and the memory module stores the memory feature set;
the method further comprising:
obtaining an initial training set, the initial training set including training samples corresponding to a plurality of tasks;
performing model training according to the initial training set to create an initial model including the memory module; and
obtaining real image data to perform model adjustment on the initial model using the real image data to obtain the to-be-migrated model.

7. An electronic device comprising:
a memory storing a computer program; and
a processor coupled with the memory and, when the computer program is executed, configured to:
obtain a to-be-migrated model, the to-be-migrated model including a memory feature set, and the memory feature set representing a feature vector set associated with an application scene corresponding to the to-be-migrated model;
perform metric calculation on at least one piece of sample data of a target scene and the memory feature set to obtain at least one metric calculation result;
update the memory feature set according to the at least one metric calculation result to obtain a target memory feature set, the target memory feature set representing a feature vector set associated with the target scene;
obtain a target detection model by replacing the memory feature set of the to-be-migrated model with the target memory feature set;
in response to the to-be-migrated model not being pruned and quantized, perform data expansion on at least one piece of sample data of the target scene to expand a data set; and
perform backpropagation training on the to-be-migrated model using the expanded data set to update a model parameter of the to-be-migrated model except for the memory feature set.

8. The device according to claim 7, wherein the processor is further configured to:
obtain a to-be-detected image;
perform the metric calculation on the to-be-detected image and the target memory feature set using the target detection model to obtain a target metric calculation result; and
determine a target detection result according to the target metric calculation result, the target memory feature set including at least one piece of memory feature information.

9. The device according to claim 8, wherein the processor is further configured to:
perform feature extraction on the to-be-detected image to obtain at least one piece of depth feature information; and
perform the metric calculation on the at least one piece of depth feature information and the at least one piece of memory feature information to obtain the target metric calculation result.

10. The device according to claim 8, wherein the processor is further configured to:
perform decoding processing on the target metric calculation result to obtain the target detection result of the to-be-detected image.

11. The device according to claim 7, wherein the processor is further configured to:
determine the target scene;
obtain at least one piece if initial sample data of the target scene according to the target scene; and
perform labeling processing on the at least one piece of initial sample data to obtain the at least one piece of sample data of the target scene.

12. The device according to claim 7, wherein:
the to-be-migrated model includes a memory module, and the memory module stores the memory feature set; and
the processor is further configured to:
obtain an initial training set, the initial training set including training samples corresponding to a plurality of tasks;
perform model training according to the initial training set to creating an initial model including the memory module; and
obtain real image data to perform model adjustment on the initial model using the real image data to obtain the to-be-migrated model.

13. A non-transitory computer storage medium storing a computer program and, when executed by a processor, causes the processor to:
   obtain a to-be-migrated model, the to-be-migrated model including a memory feature set, and the memory feature set representing a feature vector set associated with an application scene corresponding to the to-be-migrated model;
   perform a metric calculation on at least one piece of sample data of a target scene and the memory feature set to obtain at least one metric calculation result;
   update the memory feature set according to the at least one metric calculation result to obtain a target memory feature set, the target memory feature set representing a feature vector set associated with the target scene;
   obtain a target detection model by replacing the memory feature set of the to-be-migrated model with the target memory feature set;
   in response to the to-be-migrated model not being pruned and quantized, perform data expansion on at least one piece of sample data of the target scene to expand a data set; and
   perform backpropagation training on the to-be-migrated model using the expanded data set to update a model parameter of the to-be-migrated model except for the memory feature set.

14. The storage medium according to claim 13, wherein the processor is further configured to:
   obtain a to-be-detected image;
   perform the metric calculation on the to-be-detected image and the target memory feature set using the target detection model to obtain a target metric calculation result; and
   determine a target detection result according to the target metric calculation result, the target memory feature set including at least one piece of memory feature information.

15. The storage medium according to claim 14, wherein the processor is further configured to:
   perform feature extraction on the to-be-detected image to obtain at least one piece of depth feature information; and
   perform the metric calculation on the at least one piece of depth feature information and the at least one piece of memory feature information to obtain the target metric calculation result.

16. The storage medium according to claim 14, wherein the processor is further configured to:
   perform decoding processing on the target metric calculation result to obtain the target detection result of the to-be-detected image.

17. The storage medium according to claim 13, wherein the processor is further configured to:
   determine the target scene;
   obtain at least one piece of initial sample data of the target scene according to the target scene; and
   perform labeling processing on the at least one piece of initial sample data to obtain the at least one piece of sample data of the target scene.

18. The storage medium according to claim 13, wherein:
   the to-be-migrated model includes a memory module, and the memory module stores the memory feature set; and
   the processor is further configured to:
      obtain an initial training set, the initial training set including training samples corresponding to a plurality of tasks;
      perform model training according to the initial training set to create an initial model including the memory module; and
      obtain real image data to perform a model adjustment on the initial model using the real image data to obtain the to-be-migrated model.

* * * * *